(12) United States Patent
Nakahata et al.

(10) Patent No.: US 9,981,322 B2
(45) Date of Patent: May 29, 2018

(54) DRILL AND DRILLING METHOD FOR WORKPIECE

(71) Applicant: FUJI JUKOGYO KABUSHIKI KAISHA, Tokyo (JP)

(72) Inventors: Tatsuo Nakahata, Tokyo (JP); Manabu Saito, Tokyo (JP); Masanori Hosoi, Tokyo (JP); Hideharu Takahashi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days. days.

(21) Appl. No.: 14/875,870

(22) Filed: Oct. 6, 2015

(65) Prior Publication Data
US 2016/0023281 A1 Jan. 28, 2016

Related U.S. Application Data

(63) Continuation of application No. 12/318,249, filed on Dec. 23, 2008, now Pat. No. 9,180,531.

(51) Int. Cl.
*B23B 51/02* (2006.01)
*B23B 35/00* (2006.01)

(52) U.S. Cl.
CPC ............ *B23B 51/02* (2013.01); *B23B 35/005* (2013.01); *B23B 35/00* (2013.01); *B23B 2222/56* (2013.01);
(Continued)

(58) Field of Classification Search
CPC . B23B 35/00; B23B 2251/14; B23B 2251/18; B23B 2226/275; Y10T 408/9097
(Continued)

(56) References Cited

U.S. PATENT DOCUMENTS

| 1,309,706 A | 7/1919 | Taylor |
| 1,320,985 A | 11/1919 | Brightman |

(Continued)

FOREIGN PATENT DOCUMENTS

| DE | 29919858 | 4/2000 |
| DE | 20209767 | 11/2003 |

(Continued)

OTHER PUBLICATIONS

Notification of Reasons for Refal dated May 14, 2013 for Japanese Application No. 2008-333380, with English translation.
(Continued)

*Primary Examiner* — Daniel Howell
*Assistant Examiner* — Paul M Janeski
(74) *Attorney, Agent, or Firm* — Smith, Gambrell & Russell, LLP (57) ABSTRACT

A drill includes a cutting edge. The cutting edge has a point angle which is continuously decreased from a center-position point angle A (herein, 0°<A<180°) at a center position to a maximum-diameter-position point angle of 0° at a maximum diameter position. The cutting edge has a relief angle which is continuously decreased from the center position to the maximum diameter position. The cutting edge of the drill has a relief angle at the maximum diameter position. Hence, the cutting edge also serves as a cutting edge for reaming. The ridgeline and relief face of the cutting edge have no corner, thereby providing good wear resistance.

10 Claims, 6 Drawing Sheets

(52) U.S. Cl.
CPC ..... *B23B 2226/275* (2013.01); *B23B 2226/61* (2013.01); *B23B 2228/36* (2013.01); *B23B 2251/04* (2013.01); *B23B 2251/082* (2013.01); *B23B 2251/14* (2013.01); *B23B 2251/18* (2013.01); *Y10T 408/03* (2015.01); *Y10T 408/9097* (2015.01)

(58) Field of Classification Search
USPC .............................. 408/230, 229, 227, 1 R
See application file for complete search history.

(56) References Cited

U.S. PATENT DOCUMENTS

| | | | |
|---|---|---|---|
| 2,084,737 | A | 6/1937 | Magn |
| 2,258,674 | A | 10/1941 | Ceska |
| 3,443,459 | A | 5/1969 | Mackey et al. |
| 4,132,493 | A | 1/1979 | Hosoi |
| 4,411,563 | A | 10/1983 | Moon |
| 4,440,532 | A | 4/1984 | D'Apuzzo |
| 4,662,803 | A | 5/1987 | Arnold |
| 4,725,171 | A | 2/1988 | DeTorre |
| 4,932,815 | A | 6/1990 | Kras |
| 4,936,721 | A | 6/1990 | Meyer |
| 5,141,369 | A | 8/1992 | Palace |
| 5,217,332 | A | 6/1993 | Takasaki et al. |
| 5,282,705 | A | 2/1994 | Shiga et al. |
| 5,486,075 | A | 1/1996 | Nakamura et al. |
| 5,558,475 | A | 9/1996 | Hakansson et al. |
| 5,636,948 | A | 6/1997 | Rexi |
| 5,725,338 | A | 3/1998 | Cabaret et al. |
| 6,916,139 | B2 | 7/2005 | Yanagida et al. |
| 6,929,434 | B2 | 8/2005 | Prokop |
| 6,997,651 | B2 * | 2/2006 | Kawai ...................... B23C 5/10 407/53 |
| 7,665,935 | B1 | 2/2010 | Garrick et al. |
| 7,717,710 | B2 | 5/2010 | Danger et al. |
| 8,132,989 | B2 | 3/2012 | Iguchi et al. |
| 2003/0129031 | A1 | 7/2003 | Mast et al. |
| 2005/0135889 | A1 | 6/2005 | Turrini et al. |
| 2008/0193234 | A1 | 8/2008 | Davancens et al. |
| 2010/0158626 | A1 | 6/2010 | Nakahata et al. |
| 2010/0166517 | A1 | 7/2010 | Saito et al. |
| 2010/0232899 | A1 | 9/2010 | Saito et al. |
| 2011/0200403 | A1 | 8/2011 | Gruber |

FOREIGN PATENT DOCUMENTS

| | | |
|---|---|---|
| DE | 10346217 | 4/2005 |
| EP | 2202018 | 6/2010 |
| JP | S57127608 | 8/1982 |
| JP | S63306812 | 12/1988 |
| JP | H02237708 | 9/1990 |
| JP | H05245711 | 9/1993 |
| JP | H0675612 | 10/1994 |
| JP | H11114712 | 4/1999 |
| JP | 2602032 Y2 | 12/1999 |
| JP | 2002-036018 | 2/2002 |
| JP | 2007-144526 | 6/2007 |
| JP | 2008-036759 | 2/2008 |
| JP | 2009-039811 | 2/2009 |
| SU | 1085702 | 4/1984 |
| WO | 9731741 | 9/1997 |
| WO | 2005030418 | 4/2005 |

OTHER PUBLICATIONS

European Search Report dated Feb. 15, 2011 for Application No. EP 10 19 2825.

European Search Report dated Mar. 2, 2010 for Application No. EP 09 18 0077.

Extended European Search Report dated Jun. 17, 2010 for Application No. EP 10 15 5199.

* cited by examiner

DRILL AND DRILLING METHOD FOR WORKPIECE

BACKGROUND OF THE INVENTION

1. Field of the Invention

The present invention relates to a drill including a cutting edge a point angle of which varies depending on a position, and a drilling method for a workpiece.

2. Description of the Related Art

Examples of the drill including the cutting edge a point angle of which varies depending on a position may be double angle drills disclosed in Japanese Unexamined Patent Application Publication No. 63-306812 (hereinafter, referred to as document '812) and in Japanese Unexamined Utility Model Application Publication No. 06-75612 (hereinafter, referred to as document '612).

Such a double angle drill includes a primary cutting edge and a secondary cutting edge. The tip portion of the primary cutting edge has a tip shape of a metal drill. The secondary cutting edge is flat, is continuous to the primary cutting edge, and has a smaller point angle than that of the primary cutting edge.

Documents '812 and '612 teach that the double angle drill is suitable for drilling a hole in a fiber reinforced plastic composite material and a metal material at a time.

With the double angle drill, the primary cutting edge drills a primary hole with a relatively small diameter, and then the secondary cutting edge cuts the outer periphery of the primary hole to drill a secondary hole with a target diameter. During drilling, transient delamination may appear at the periphery of the primary hole of the composite material. The delamination is removed by cutting the primary hole by the secondary cutting edge.

Unfortunately, as disclosed in document '612, the double angle drill typically has low wear resistance. Document '612 discloses a configuration to increase the wear resistance of the cutting edge by covering the cutting edge with a diamond film with a certain film thickness.

However, the double angle drill has corners at the boundary between the primary and secondary cutting edges and at the outermost periphery of the secondary cutting edge. A stress is likely concentrated at the corners, and hence chipping likely appears at the corners. Thus, such a shape of the drill decreases the wear resistance of the drill.

In addition, to drill a hole in a component member, as a workpiece, in which a metal material and a fiber reinforced plastic composite material are combined, the double angle drill still has problems as follows.

In a situation in which the component member is drilled by the double angle drill from the metal material side, when the fiber reinforced plastic composite material is drilled after the metal material is drilled, the primary cutting edge penetrates through the fiber reinforced plastic composite material while insufficiently cutting but pressing fibers of the fiber reinforced plastic composite material. Then, the secondary cutting edge cuts the fibers. At this time, delamination and fiber fraying are expanded in the component member at the pressed portion. The delamination and fiber fraying expanded in the component member may not be cut even by the secondary cutting edge. Thus, the delamination and fiber fraying may not be removed and may still remain.

In another situation in which the component member is drilled by the double angle drill from the fiber reinforced plastic composite material side, when the metal member is drilled after the fiber reinforced plastic composite material is drilled, the fiber reinforced plastic composite material is cut while being raked by the secondary cutting edge having a rake angle. Hence, burr and fiber fraying may appear at the entrance of the drilled hole.

SUMMARY OF THE INVENTION

The present invention is made to address the above-mentioned problems of the related art, and an object of the present invention is, in a drill including a cutting edge a point angle of which varies depending on a position, to increase wear resistance of the cutting edge. Accordingly, high precision drilling for a long term can be provided.

Also, another object of the present invention is, when a metal material and a fiber reinforced plastic composite material are drilled, to prevent delamination and fiber fraying from appearing at the fiber reinforced plastic composite material.

According to an aspect of the present invention, a drill includes a cutting edge, the cutting edge has a point angle which is continuously decreased from a center-position point angle A (herein, 0°<A<180°) at a center position to a maximum-diameter-position point angle of 0° at a maximum diameter position, and the cutting edge has a relief angle which is continuously decreased from the center position to the maximum diameter position.

With the aspect, since the cutting edge has the point angle which is decreased from the center position to the maximum diameter position in a continuous changing manner, the ridgeline has no corner, which is likely chipped. Also, a cutting load is decreased at a position near the maximum diameter, thereby increasing wear resistance of the cutting edge.

In addition, with the aspect, since the cutting edge has the relief angle which is decreased in a continuous changing manner, a relief face has no corner, which is likely subjected to wear. Also, reaming is performed at a position near the maximum diameter, thereby increasing the wear resistance of the cutting edge.

Further, with the aspect, since the ridgeline of the cutting edge is formed of a curve (including a case in which a straight line is partly contained), a cutter section of this aspect has a longer edge length as compared with a cutter section with an equivalent size of a conventional cutting edge having a ridgeline formed of a straight line. With the large edge length, regarding a certain cutting amount, a cutting amount per unit length of the ridgeline of the cutting edge is decreased, and hence a wear amount is decreased, thereby increasing the wear resistance of the cutting edge.

Accordingly, with the aspect, by increasing the wear resistance of the cutting edge as described above, high precision drilling for a long term can be provided.

In the above-mentioned drill, the cutting edge may preferably have a relief angle (ε) at the maximum diameter position.

With the configuration, since the cutting edge has the relief angle (ε) at the maximum diameter position, a cutting edge part for reaming is formed. Thus, the cutting edge can provide reaming. The cutting edge part for reaming is continuous to a cutting edge part for drilling located near the drill tip with respect to the cutting edge part for reaming. The cutting edge part for drilling is integral with the cutting edge part for reaming. The point angle and the relief angle of the cutting edge are continuously changed. Hence, the ridgeline of the cutting edge has no corner, which is likely chipped. Also, the relief surface has no corner, which is likely subjected to wear. The wear resistance of the cutting edge is not deteriorated even when the cutting edge part for reaming is provided.

In the above-mentioned drill, the ridgeline of the cutting edge may be preferably a parabolic ridgeline formed of a part of a parabola.

In the above-mentioned drill, the ridgeline of the cutting edge may be preferably an arcuate ridgeline formed of a single arc.

In the above-mentioned drill, assuming that the relief angle at the center position is δ, the center-position point angle A and the center-position relief angle δ may preferably satisfy a relationship of δ>(180°−A)/2.

In the above-mentioned drill, the cutting edge may preferably have a rake angle.

In the above-mentioned drill, the cutting edge may preferably have a rake angle of zero.

The above-mentioned drill may preferably further include two helical flutes; lands formed between the helical flutes; and margins at edges of the lands along the helical flutes.

In the above-mentioned drill, a length of the cutting edge along an axis thereof may be preferably at least 1.6 times a maximum diameter thereof.

According to another aspect of the present invention, a drill includes a cutting edge, and the cutting edge has a point angle which is continuously decreased from a center-position point angle A (herein, 0°<A<180°) at a center position to a maximum-diameter-position point angle of 0° at a maximum diameter position.

In the above-mentioned drill, the ridgeline of the cutting edge may be preferably a parabolic ridgeline formed of a part of a parabola.

In the above-mentioned drill, the ridgeline of the cutting edge may be preferably an arcuate ridgeline formed of a single arc.

In the above-mentioned drill, a length of the cutting edge along an axis thereof may be preferably at least 1.6 times a maximum diameter thereof.

According to still another aspect of the present invention, a drill includes a cutting edge, and the cutting edge has a relief angle which is continuously decreased from a center position to a maximum diameter position.

In the above-mentioned drill, the cutting edge may preferably have a relief angle at the maximum diameter position.

According to yet another embodiment of the present invention, a drilling method for a workpiece includes a first step of drilling a hole in the workpiece by using a drill including a cutting edge, the cutting edge having a point angle which is continuously decreased from a center-position point angle A (herein, 0°<A<180°) at a center position to a maximum-diameter-position point angle of 0° at a maximum diameter position, the cutting edge having a relief angle which is continuously decreased from the center position to the maximum diameter position, and by cutting the workpiece by the cutting edge at the center-position side; and a second step of reaming by cutting the drilled hole formed in the first step, by the cutting edge at the maximum-diameter-position side while gradually shifting from the first step.

BRIEF DESCRIPTION OF THE DRAWINGS

FIG. 4A1 is a cross-sectional view taken along line IVA1-IVA1 in FIG. 2, FIG. 4A2 is a cross-sectional view taken along line IVA2-IVA2 in FIG. 2, FIG. 4A3 is a cross-sectional view taken along line IVA3-IVA3 in FIG. 2, FIG. 4A4 is a cross-sectional view taken along line IVA4-IVA4 in FIG. 2, FIG. 4B1 is a detail view of part IVB1 in FIG. 4A1, FIG. 4B2 is a detail view of part IVB2 in FIG. 4A2, FIG. 4B3 is a detail view of part IVB3 in FIG. 4A3, and FIG. 4B4 is a detail view of part IVB4 in FIG. 4A4;

FIGS. 7A1 to 7B4 are cross-sectional views each showing a drill according to a second embodiment of the present invention;

DESCRIPTION OF THE PREFERRED EMBODIMENTS

Hereinafter, embodiments of the present invention are described with reference to the attached drawings. These embodiments are merely examples of the present invention, and hence the present invention should not be limited to these embodiments.

First Embodiment

Figure 1:
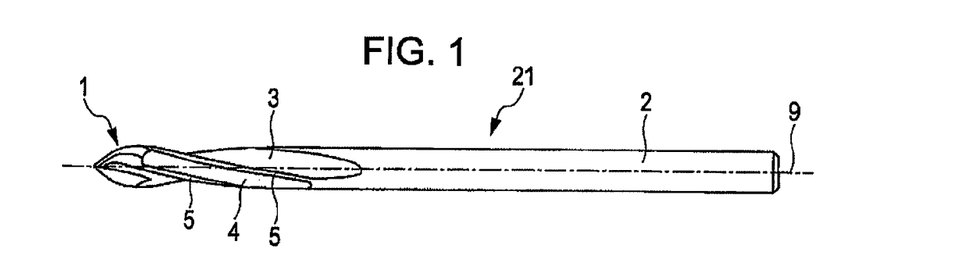
FIG. 1 is a side view showing a drill according to a first embodiment of the present invention.

A first embodiment of the present invention is described below with reference to FIGS. 1 to 4B4. FIG. 1 is a side view showing a drill according to the first embodiment of the present invention.

Referring to FIG. 1, a drill 21 of this embodiment includes a cutter section 1 and a shank section 2. Helical flutes 3 are formed on the cutter section 1 and the shank section 2.

Figure 2:
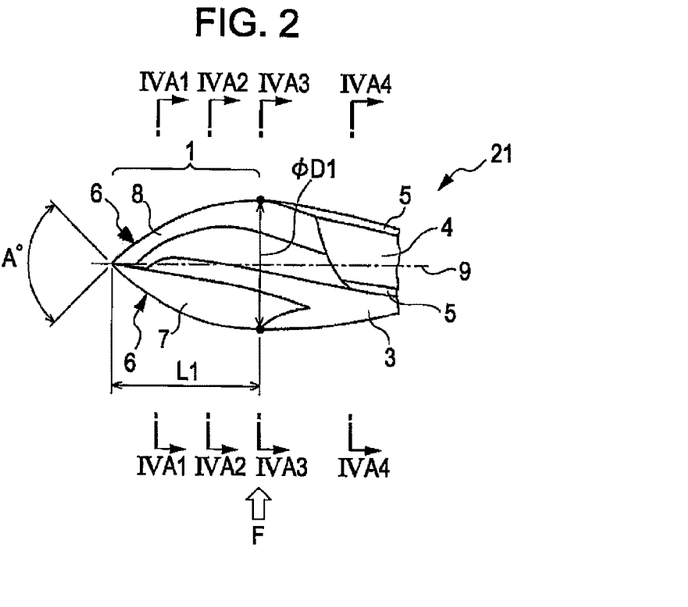
FIG. 2 is an enlarged view showing a tip portion of the drill in FIG. 1.

FIG. 2 is an enlarged view showing a tip portion of the drill 21 in FIG. 1.

The cutter section 1 includes a pair of cutting edges 6 arranged symmetrically about an axis 9. The cutting edges 6 each have a rake face 7 and a relief face 8.

The cutter section 1 is finished by X thinning (cross thinning), and rake faces 7 are formed at portions removed by thinning. The portions removed by thinning are continuous to the helical flutes 3. The helical flutes 3 are two threads which are twisted at a predetermined helix angle. Lands 4 are formed between the helical flutes 3. Margins 5 are formed at edges of the lands 4 along the helical flutes 3. The margins 5 contact the inner surface of a work hole to support the drill and to burnish the hole.

Referring to FIG. 2, the cutter section 1 has a maximum diameter φD1 and a length L1. It is assumed that the point angle of each cutting edge 6 at a center position is A (herein, 0°<A<180°). The center-position point angle A is preferably in a range of 90°<A<150°. The point angle at a position (position at line IVA3-IVA3) corresponding to the maximum diameter φD1 is 0°.

The point angle of the cutting edge 6 is decreased from the center-position point angle A to the maximum-diameter-position point angle of 0° in a continuously changing manner. Accordingly, the ridgeline of the cutting edge 6 defines a smooth curve without a corner (point of discontinuity). Also, it is assumed that the curve defined by the ridgeline of the cutting edge 6 is a curve protruding to the outside without a point of inflection. For example, in the ridgeline of the cutting edge 6, the curve from the center-position point angle A to the maximum-diameter-position point angle of 0° is defined as a part of a parabola. The ridgeline of the cutting edge 6 may partly contain a straight line. In this case, the point angle of the cutting edge 6 is continuously changed even at a transition portion between the straight line and the curve (not containing a straight line), thereby eliminating a corner.

Figure 3:
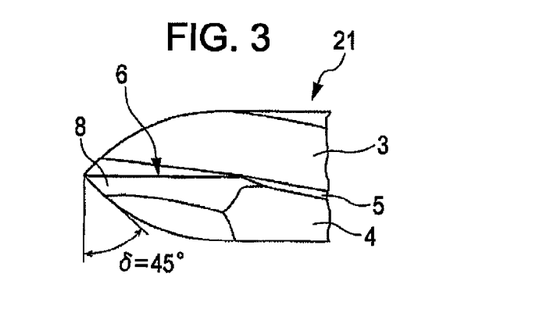
FIG. 3 is a side view showing the drill when seen in a direction indicated by arrow F in FIG. 2.
Figure 4A:
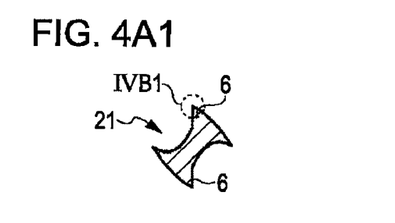
Figure 4A:
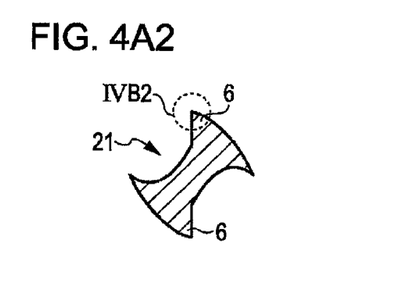

FIG. 3 is a side view showing the drill 21 when seen in a direction indicated by arrow F in FIG. 2. It is to be noted that the drill 21 has a three-dimensional shape that is symmetric about the axis 9. Thus, the drill 21 has a symmetry such that a side view at any given angle has the same side view as a side view 180° opposite thereto.

Referring to FIG. 3, it is assumed that the relief angle at the center position is $\delta$. The center-position point angle A and the center-position relief angle $\delta$ may preferably satisfy a relationship of $\delta > (180° - A)/2$. FIG. 3 illustrates the case when $\delta = 45°$.

Referring to FIGS. 4B1, 4B2, and 4B3, as the position shifts from the tip to the rear side along the axis 9, the relief angle of the cutting edge 6 is gradually decreased from the center-position relief angle $\delta$ to a relief angle at line IVA3-IVA3 in a continuously changing manner. In FIGS. 3, and 4A1 to 4B4, when $\delta = 45°$, line IVA1-IVA1 denotes the position at a relief angle of 30°, line IVA2-IVA2 denotes the position at a relief angle of 20°, and $\varepsilon = 5°$ at the maximum diameter position (line IVA3-IVA3). The drill 21 is formed into a shape in which the relief angle of the cutting edge 6 is decreased from the center position to the maximum diameter position (line IVA3-IVA3) in a continuously changing manner. Herein, a condition of $\varepsilon < \delta$ is satisfied. Also, a range of $\varepsilon < 15°$ may be preferably satisfied.

Also, referring to FIG. 4A4, the lands 4 are formed between the helical flutes 3, and the margins 5 are formed at edges of the lands 4 along the helical flutes 3. Four margins 5 in total are formed along the outer periphery. Each land 4 has a dented relief part 4a between the margins 5. For example, the width of the margin 5 is in a range of from 0.1 to 1.5 mm, the width of the relief part 4a is 2.5 mm, and the depth of the relief part 4a is in a range of from 0.3 to 1.2 mm.

Also, referring to FIGS. 4A1 to 4A3, and 4B1 to 4B3, the cutting edge 6 has no rake angle. That is, the rake angle is zero, and the rake face 7 is orthogonal to a work surface.

In the drill 21 with the above-described structure, the cutting edge 6 has no rake angle, and hence, the drill 21 is suitable for processing of a fiber reinforced plastic composite material such as carbon fiber reinforced plastic (CFRP). This is because the fiber reinforced plastic composite material can obtain a fine, precise work surface without fiber fraying or the like by drilling, rather than by shearing. In particular, delamination hardly appears at a workpiece and the workpiece is precisely processed by providing no rake angle and finely cutting the workpiece, rather than by providing a rake angle and cutting into the workpiece.

When the drill 21 is applied to processing of the fiber reinforced plastic composite material, it is preferable that a slenderness ratio (L1/$\phi$D1) of the cutter section 1 is at least 1.6. For example, it is assumed that (L1/$\phi$D1)=1.6. Accordingly, the edge length of the cutting edge having a relatively small point angle, corresponding to the above-mentioned secondary cutting edge of the double angle drill, can be sufficiently provided. Even if transient delamination appears at the periphery of a hole of the composite material, which is drilled by a cutting edge part located near the drill tip and having a relatively large point angle, the delamination is removed by subsequent cutting of the hole by a continuously arranged cutting edge part having a relatively small point angle.

Figure 4A:
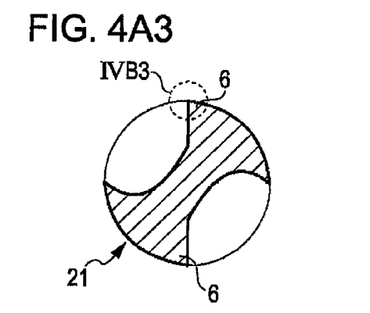
Figure 4A:
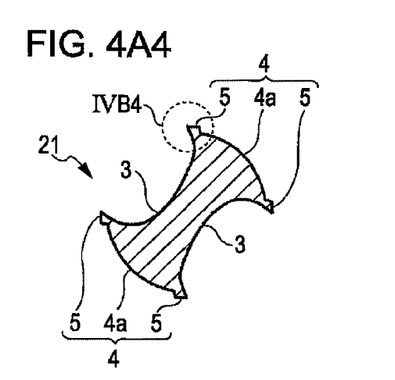
Figure 4B:
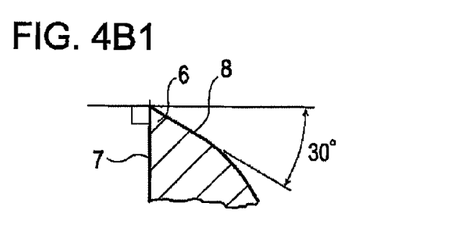
Figure 4B:
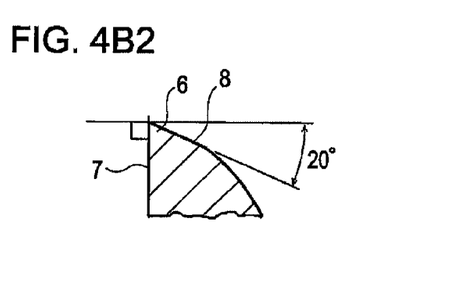
Figure 4B:
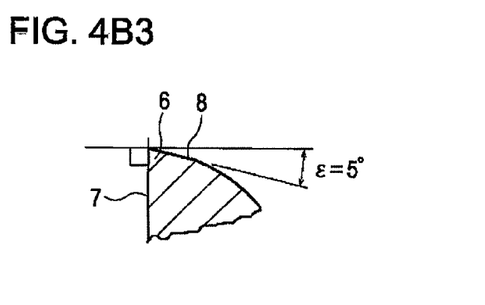
Figure 4B:
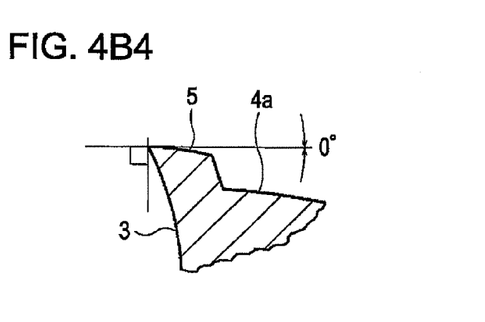

With the drill 21 of this embodiment, the cutting edge 6 shown in FIGS. 4A3 and 4B3 forms a cutting edge part for reaming, which has the point angle of 0° and the relief angle $\varepsilon$. Subsequently to drilling, reaming by this cutting edge part can be provided. Further, subsequently to reaming by the cutting edge part, burnishing by the margins 5 is provided. Hence, the work hole is precisely finished. Thusly, the drill 21 can provide the process from drilling to finishing.

In addition, the drill 21 of this embodiment includes the four margins 5 extending along the helical flutes 3. The four margins 5 support the drill 21 at four points in any cross section, and the drill 21 is twisted. Hence, the positions of the four supporting points shift depending on a position in the axial direction. Accordingly, the drill 21 is stably held at the work hole or at the inner surface of a bushing guide, and hole processing with a reduced bend can be provided.

With the drill 21 of this embodiment, the point angle and the relief angle of the cutting edge 6 are continuously changed. Thus, the ridgeline of the cutting edge 6 has no corner, which is likely chipped. Also, the relief face has no corner, which is likely subjected to wear. Thus, the drill 21 has good wear resistance, and thus can provide high precision drilling for a long term.

Next, a case is described in which a drill 21a is used to drill a hole in a component member 30 serving as a workpiece in FIGS. 5A to 5F. The drill 21a is configured such that the center-position point angle A of the drill 21 is set to 120° and the slenderness ratio (L1/$\phi$D1) of the cutter section 1 is set to 1.6. Referring to FIGS. 5A to 5F, the component member 30 is formed by combining a metal material 31 and a fiber reinforced plastic composite material 32.

Figure 5A:
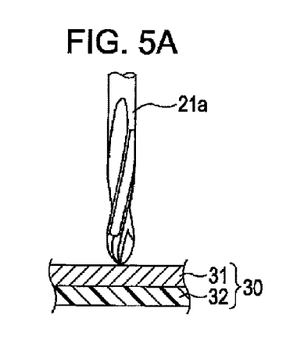
FIGS. 5A to 5F illustrate processes of drilling by the drill according to the first embodiment of the present invention.
Figure 5B:
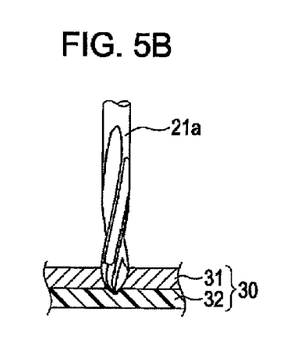
Figure 5C:
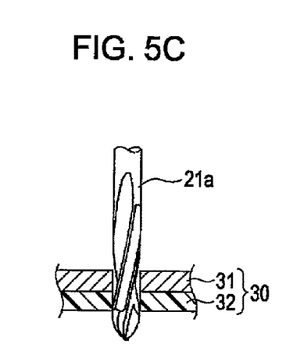

FIGS. 5A to 5C illustrate a case in which the drill 21a drills the component member 30 from the metal material 31 side. The ridgeline of a cutting edge of the drill 21a is formed into a smooth curve, and hence, cutting smoothly progresses from the metal material 31 to the fiber reinforced plastic composite material 32. Referring to FIG. 5B, a cutting edge part located near the drill tip and having a relatively large point angle cuts the fiber reinforced plastic composite material 32. Even if transient delamination appears at the periphery of the drilled hole of the fiber reinforced plastic composite material 32, the delamination is removed by subsequent reaming by a continuously arranged cutting edge part having a relatively small point angle (FIG. 5B to FIG. 5C). Referring to FIG. 5C, a cutting edge part having the point angle of 0° and the relief angle $\varepsilon$ contacts the work surface in a parallel manner and cuts the work surface. Hence, no burr appears.

Figure 5D:
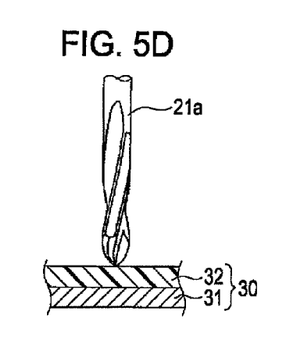
Figure 5E:
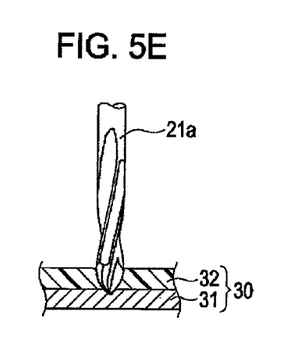
Figure 5F:
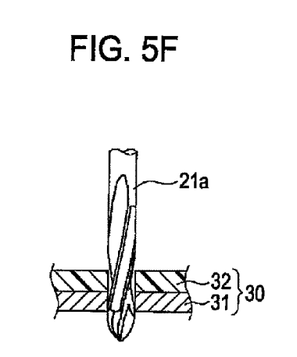

FIGS. 5D to 5F illustrate a case in which the drill 21a drills the component member 30 from the fiber reinforced plastic composite material 32 side. The ridgeline of the cutting edge of the drill 21a is formed into a smooth curve, and hence, cutting smoothly progresses from the fiber reinforced plastic composite material 32 to the metal material 31. Referring to FIG. 5D, the cutting edge part located near the drill tip and having the relatively large point angle cuts the fiber reinforced plastic composite material 32. Even if transient delamination appears at the periphery of the drilled hole of the fiber reinforced plastic composite material 32, the delamination is removed by subsequent reaming by the continuously arranged cutting edge part having the relatively small point angle. Further, the cutting edge part having the point angle of 0° and the relief angle ε contacts the work surface in a parallel manner and cuts the work surface of the fiber reinforced plastic composite material 32 and the metal material 31. Hence, no burr appears.

Figure 6:
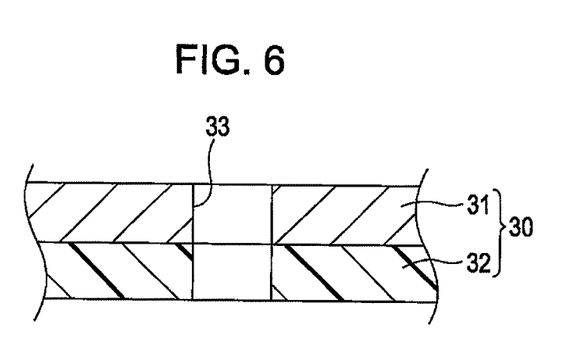
FIG. 6 is a cross-sectional view showing a hole drilled by the drill according to the first embodiment of the present invention.

In any of the case in which the component member 30 is drilled by the drill 21a from the metal material 31 side, and the case in which the component member 30 is drilled by the drill 21a from the fiber reinforced plastic composite material 32 side, referring to FIG. 6, a fine, highly precise hole 33 without burr can be processed at the fiber reinforced plastic composite material 32 and the metal material 31.

Second Embodiment

Figure 7A:
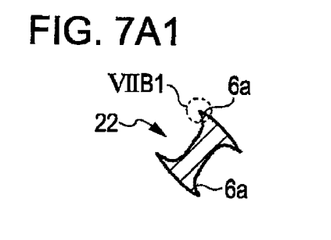
Figure 7A:
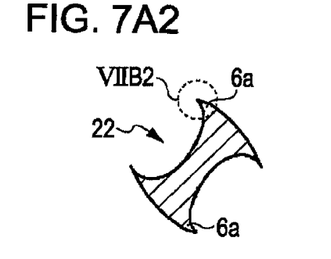
Figure 7A:
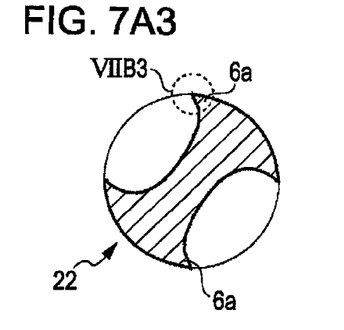
Figure 7A:
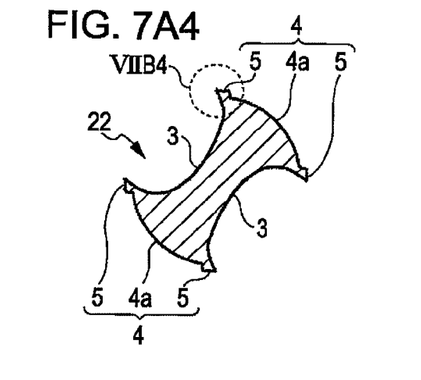
Figure 7B:
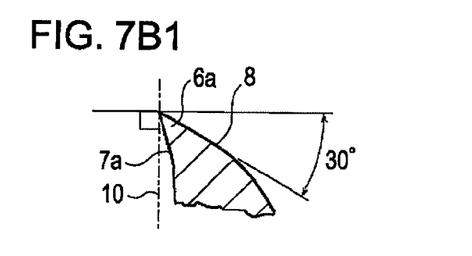
Figure 7B:
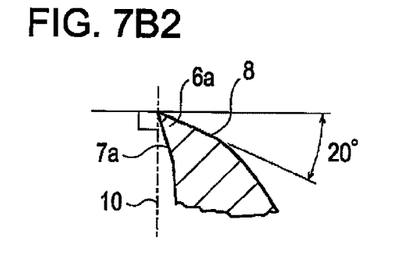
Figure 7B:
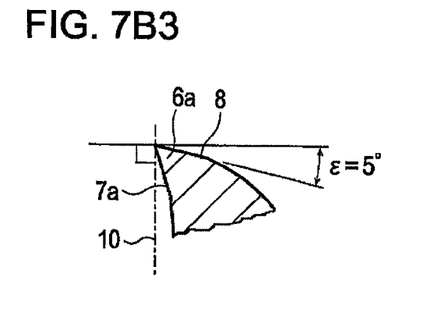
Figure 7B:
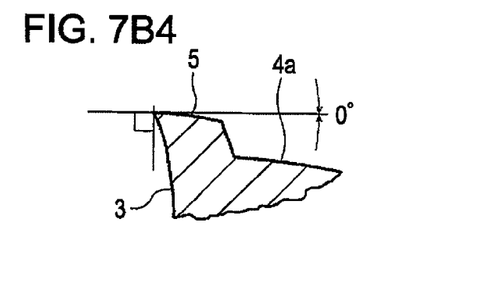

Next, a second embodiment of the present invention is described. FIGS. 7A1 to 7B4 are cross-sectional views each showing a drill according to the second embodiment of the present invention. The positional relationship of the cross sections is similar to that of FIGS. 2A1 to 2B4. A drill 22 of this embodiment includes a cutting edge having a rake angle and is suitable for metal processing.

Referring to FIGS. 7A1 to 7A3, and 7B1 to 7B3, a cutting edge 6a has a rake angle. In particular, the cutting edge 6a has a rake face 7a inclined toward a relief face 8 with respect to a line 10 orthogonal to a work surface. Other structure is similar to that of the drill 21 of the first embodiment. Dimensions of respective parts are designed depending on the purpose of use.

Figure 8:
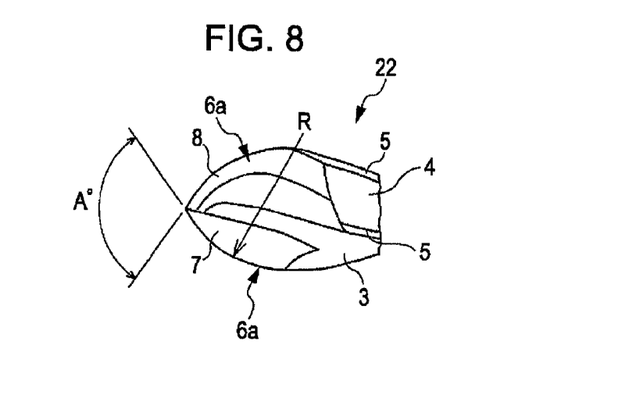
FIG. 8 is a side view showing a tip portion of an exemplary drill according to the second embodiment of the present invention.

When the drill 22 is applied to metal processing, for example, referring to FIG. 8, the slenderness ratio (L1/φD1) of a cutter section 1 is set smaller than that for a composite material. In this case, the ridgeline of the cutting edge 6a of the drill 22 may be an arcuate ridgeline formed of a single arc with a curvature radius R as shown in FIG. 8. With the arcuate ridgeline formed of a single arc, such a drill can be relatively easily fabricated.

Third Embodiment

Figure 9:
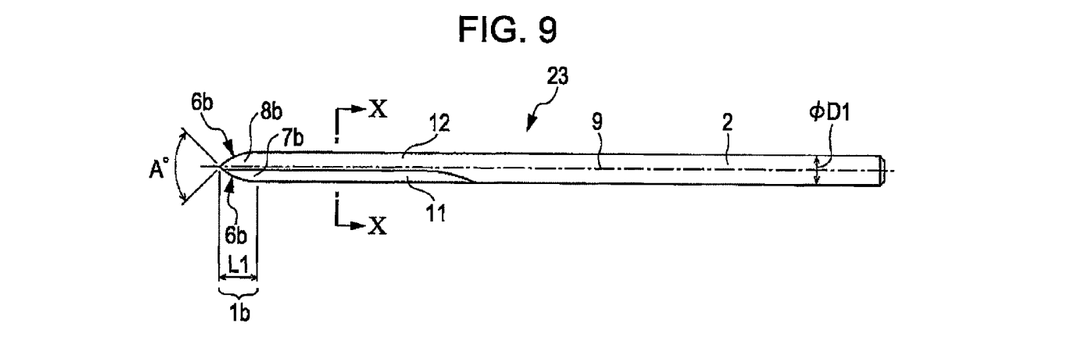
FIG. 9 is a side view showing a drill according to a third embodiment of the present invention.
Figure 10:
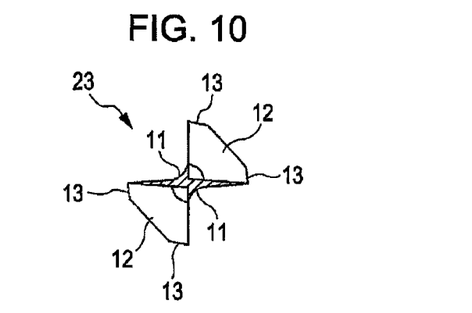
FIG. 10 is a cross-sectional view taken along line X-X in FIG. 9.

Next, a third embodiment of the present invention is described. FIG. 9 is a cross-sectional view showing a drill according to the third embodiment of the present invention. FIG. 10 is a cross-sectional view taken along line X-X in FIG. 9. A drill 23 of this embodiment is configured such that the helical flutes 3 of the drill 21 in the above-described first embodiment are replaced by V-grooves 11.

Referring to FIG. 9, the drill 23 includes a cutter section 1b and a shank section 2. The cutter section 1b includes a pair of cutting edges 6b arranged symmetrically about an axis 9. The cutting edges 6b each have a rake face 7b and a relief face 8b. Referring to FIGS. 9 and 10, two V-grooves 11 are formed between the cutter section 1b and the shank section 2. The V-grooves 11, including a removed portion of the cutter section 1b by thinning, are formed straight along the axis 9.

Referring to FIG. 10, lands 12 are formed between the V-grooves 11, and margins 13 are formed at edges of the lands 12 along the V-grooves 11. The margins 13 contact the inner surface of a work hole to support the drill 23 and to burnish the hole. The four margins 13 support the drill 23 at four points in any cross section. Holding using twisting is not provided, however, the drill 23 is stably held at the work hole or at the inner surface of a bushing guide, and hole processing with a reduced bend can be provided.

What is claimed is:

1. A drill comprising:
    a cutting edge;
    lands formed between helical flutes; and
    margins at edges of the lands along the helical flutes,
    wherein the cutting edge has a point angle which is continuously decreased from a center-position point angle A at a center position to a maximum-diameter-position point angle of 0° at a maximum diameter position,
    wherein the cutting edge has a radial relief angle which is continuously decreased from the center position to the maximum diameter position,
    wherein the cutting edge has a rake angle of 0°,
    wherein a radial relief angle ε at the maximum diameter position satisfies a condition ε<15°,
    wherein the point angle A at the center position satisfies a condition 90°<A<150°,
    wherein a length of the cutting edge along an axis of the drill is at least 1.6 times a maximum diameter of the drill, and
    wherein a width of each of the margins is from 0.1 to 1.5 mm.

2. The drill according to claim 1, wherein a ridgeline of the cutting edge is a parabolic ridgeline formed of a part of a parabola.

3. The drill according to claim 1, wherein a ridgeline of the cutting edge is an arcuate ridgeline formed of a single arc.

4. The drill according to claim 1, wherein an axial relief angle at the center position is δ, and the center-position point angle A and the axial relief angle δ at the center-position satisfy a relationship of δ>(180°-A)/2.

5. The drill according to claim 1, wherein, at a position between the center position and the maximum diameter position, the radial relief angle is at least 20°.

6. The drill according to claim 5, wherein, at a position between the center position and the maximum diameter position, the radial relief angle is at least 30°.

7. A drilling method for a workpiece, comprising:
    a first step of drilling a hole in the workpiece by using a drill including a cutting edge, lands formed between helical flutes, and margins at edges of the lands along the helical flutes, and by cutting the workpiece by the cutting edge at the center-position; and
    a second step of reaming by cutting the drilled hole formed in the first step, by the cutting edge at the maximum-diameter-position while gradually shifting from the first step,
    wherein the cutting edge has a point angle which is continuously deceased from a center-position point angle A at a center position to a maximum-diameter-position point angle of 0° at a maximum diameter position,
    wherein the cutting edge has a radial relief angle which is continuously decreased from the center position to the maximum diameter position,
    wherein the cutting edge has a rake angle of 0°,
    wherein a radial relief angle ε at the maximum diameter position satisfies a condition of ε<15°,
    wherein the point angle A at the center position satisfies a condition 90°<A<150°,
    wherein a length of the cutting edge along an axis of the drill is at least 1.6 times a maximum diameter of the drill, and
    wherein a width of each of the margins is from 0.1 to 1.5 mm.

8. The drilling method of claim 7, wherein the drilled hole is formed in a multilayer component member comprising a reinforced composite material layer.

9. The drilling method of claim 8, wherein the step of reaming includes removing delaminated portions of the multilayer component member.

10. The drilling method of claim 9, wherein
the drilled hole is formed in the multilayer component member such that the hole is substantially free of burrs and substantially free of delamination between layers of the multilayer component member.

* * * * *